United States Patent [19]

Miyamoto et al.

[11] Patent Number: 4,573,676
[45] Date of Patent: Mar. 4, 1986

[54] SHEET MATERIAL TRANSFER APPARATUS

[75] Inventors: Hiroshi Miyamoto, Tokyo; Tadao Omata, Kawasaki, both of Japan

[73] Assignee: ORC Manufacturing Co., Ltd., Tokyo, Japan

[21] Appl. No.: 463,732

[22] Filed: Feb. 4, 1983

[30] Foreign Application Priority Data

Feb. 5, 1982 [JP] Japan ................................. 57-17225

[51] Int. Cl.⁴ .......................................... B65H 29/42
[52] U.S. Cl. .................................. 271/179; 271/166; 271/169; 271/212; 271/238
[58] Field of Search ............... 271/179, 212, 3.1, 236, 271/238, 147, 166, 169

[56] References Cited

U.S. PATENT DOCUMENTS

| 3,680,679 | 8/1972 | Lehmann | 271/179 X |
| 3,708,054 | 1/1973 | Gilev | 271/179 X |
| 4,108,319 | 8/1978 | Kacirek | 271/212 |

Primary Examiner—Richard A. Schacher
Attorney, Agent, or Firm—Fidelman, Wolffe & Waldron

[57] ABSTRACT

An apparatus for transferring sheet materials comprises a plurality of externally threaded rods having threads spaced at equal pitches and grooves therebetween. The threaded rods extend parallel to each other and are mounted in a one-sided box-shaped housing for rotation about their axes. The threaded rods are drivable for synchronous rotation in the same lead direction to transfer the sheet materials inserted edgewise in the grooves of the threaded rods in the lead direction in synchronism with rotation of the threaded rods.

3 Claims, 8 Drawing Figures

SHEET MATERIAL TRANSFER APPARATUS

BACKGROUND OF THE INVENTION

The present invention relates to an apparatus for transferring sheet materials such for example as printed-circuit boards, sheets of glass, or raw films.

Transfer apparatus known as sheet material lifters are used for elevating a stack or pile of sheet materials up to a vacuum chuck and enabling the latter to pick up the uppermost sheet from the stack thus lifted. The position of the top face of the sheet pile is optically detected to determine the positional difference between the top sheet face and the vacuum chuck, so that a table with the sheets piled up thereon can be lifted to bring the uppermost sheet of the stack against the vacuum chuck. When all of the stacked sheets are removed from the table, the table is lowered to its lowermost position, in which another stack of sheets is placed on the table. During this stacking operation, no sheet can be picked up from the table.

Another prior transfer apparatus comprises a rack cassette for housing sheet materials in bins or compartments therein. The rack cassette is driven in a pickup station to move the bins or compartments successively into alignment with a pickup position, in which the sheet is pushed or drawn out of the corresponding bin. After all of the bins have been emptied, the rack cassette is required to be replaced with another rack cassette with sheet materials housed therein, during which time the process of picking up sheet materials must be suspended. The foregoing prior arrangements are disadvantageous in that they allow sheet materials to be picked up only intermittently, but not continuously.

According to still another conventional apparatus, sheet materials are placed horizontally on a belt conveyor for being transferred thereby. This transfer apparatus however takes up quite a wide space.

SUMMARY OF THE INVENTION

According to the present invention, a sheet material transfer apparatus comprises a plurality of externally threaded rods having threads spaced at equal pitches and and grooves therebetween. The threaded rods extend parallel to each other and are mounted in an open-sided box-shaped housing for rotation about their axes. The threaded rods are drivable for synchronous rotation in the same lead direction to transfer sheet materials inserted edgewise in the grooves of the threaded rods in the lead direction in synchronism with rotation of the threaded rods.

It is an object of the present invention to provide a sheet material transfer apparatus which allows sheet materials to be picked up continuously and requires a reduced space for installation.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
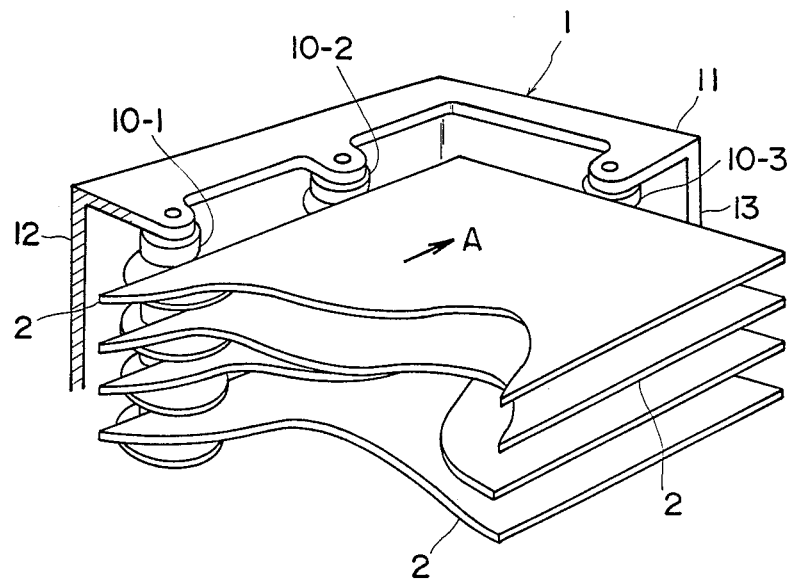
FIG. 1 is a fragmentary perspective view of a sheet transfer apparatus according to a first embodiment of the present invention.

FIG. 1 illustrates in perspective a sheet material transfer apparatus 1 according to a first embodiment of the present invention.

The sheet material transfer apparatus 1 comprises an open-sided box-shaped housing 11 having adjacent open sides and side panels 12, 13. A pair of vertical externally threaded rods 10-1, 10-2 extend parallel to and are rotatably mounted on the side panel 12. A vertical externally threaded rod 10-3 extends parallel to and is rotatably mounted on the side panel 13.

The threaded rods 10-1, 10-2, 10-3 have threads spaced at equal pitches and righthanded, that is, having the same lead direction. The threaded rods 10-1, 10-2, 10-3 are rotatable counterclockwise in synchronism with each other. The threaded rods 10-1, 10-2, 10-3 have grooves in which edges of sheet materials 2 are inserted.

When the threaded rods 10-1, 10-2, 10-3 are rotated about their own axes with a sheet material 2 inserted edgewise in the lowermost grooves of the threaded rods, the sheet material 2 is continuously lifted up the threaded rods 10-1, 10-2, 10-3 as they rotate while the sheet material 2 is subjected to a force applied in the direction of the arrow A. By successively inserting sheet materials 2 edgewise into the lowermost grooves of the the threaded rods 10-1, 10-2, 10-3 in synchronism with rotation thereof, the sheet materials 2 are received respectively in all of the grooves of the threaded rods 10-1, 10-2, 10-3. The sheet materials 2 can then be successively picked up by suckers or the like from the uppermost position in the box-like housing 11. The sheet materials 2 can be picked up in sequence at preset intervals by continuing to insert additional sheet materials 2 edgewise into the lowermost grooves of the threaded rods 10-1, 10-2, 10-3.

As the inserted sheet materials 2 are successively elevated by the threaded rods 10-1, 10-2, 10-3, the sheet materials 2 are positionally corrected thereby so that at least two edges thereof will be kept in vertical alignment. Where sheet materials 2 are identical in shape, they are aligned in vertically superimposed flat layers.

Sheet materials 2 may be stored respectively in bins bounded by partitions in a rack which are equally spaced at intervals identical with the pitch of the threaded rods 10-1, 10-2, 10-3. The sheet materials 2 thus stored in the rack may then be inserted edgewise into the grooves of the threaded rods 10-1, 10-2, 10-3 simultaneously. The transfer apparatus 1 as shown in FIG. 1 may be laid horizontally with the side panel 12 serving as the bottom for transferring the sheet materials 2 horizontally to the left or right in response to rotation of the threaded rods 10-1, 10-2, 10-3.

Figure 2:
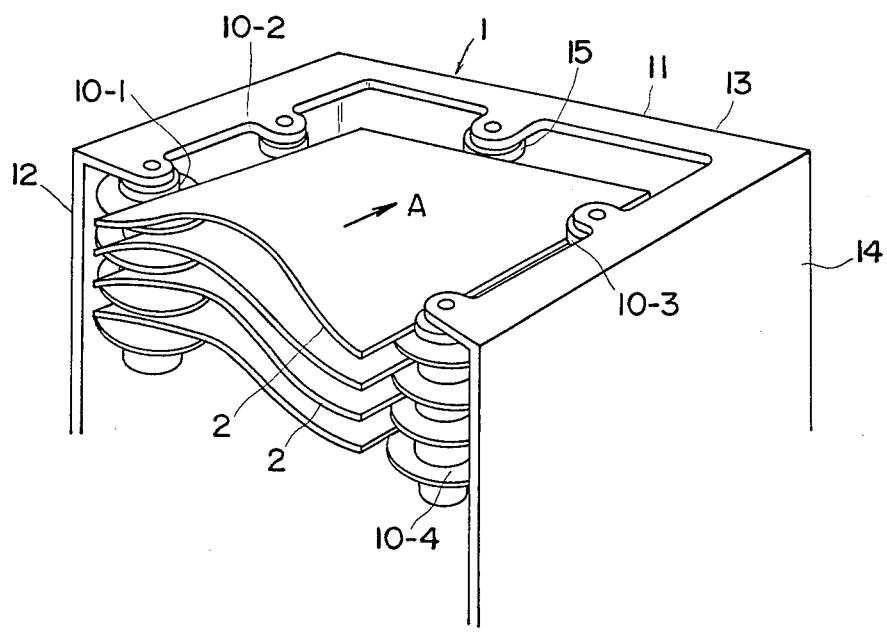
FIG. 2 is a fragmentary perspective view of a sheet transfer apparatus according to a second embodiment of the present invention.

FIG. 2 illustrates a sheet material transfer apparatus 1 constructed in accordance with a second embodiment of the present invention.

The transfer apparatus 1 is composed of an open-sided box-shaped housing 11 having side panels 12, 13, 14. A pair of vertical externally threaded rods 10-1, 10-2 extend parallel to and are rotatably mounted on the side panel 12, and a pair of vertical externally threaded rods 10-3, 10-4 extend parallel to and are rotatably mounted on the side panel 14. The side panel 13 supports thereon a parallel vertical rod 15 serving as a sheet stopper.

The threaded rods 10-1, 10-2, 10-3, 10-4 have threads spaced at equal pitches. The threads of the threaded rods 10-1, 10-2 are righthanded, while the threads of the threaded rods 10-3, 10-4 are lefthanded. The threaded rods 10-1, 10-2 are rotatable counterclockwise about their own axes in synchronism, and the threaded rods 10-3, 10-4 are rotatable clockwise about their own axes in synchronism.

Sheet materials 2 inserted edgewise in grooves of the threaded rods 10-1, 10-2, 10-3, 10-4 are caused to be elevated by rotation thereof while undergoing a force applied in the direction of the arrow A. Edges of the sheet materials 2 are held in contact with the stopper rod 15 under the force in the direction of the arrow A and can be vertically aligned.

Successive insertion of sheet materials 2 edgewise into the lowermost grooves of the threaded rods 10-1, 10-2, 10-3, 10-4 permits the sheet materials 2 to be sequentially elevated and then successively taken out at preset intervals at the uppermost position in the housing 11.

A plurality of sheet materials 2 can simultaneously be inserted edgewise into the grooves of the threaded rods 10-1, 10-2, 10-3, 10-4 from a rack having partitioned compartments for containing such sheet materials. The transfer apparatus 1 may be laid horizontally with the side panel 12, 13 or 14 serving as the bottom. With this arrangement, one of the threaded rods supported on the side panel positioned at the top may be dispensed with without impairing transportation of the sheet materials 2.

While in the foregoing embodiment the threaded rods 10-1, 10-2, 10-3, 10-4 have been described and shown as being used, other similar members may instead be employed such as rods having spiral grooves defined in their outer peripheral surfaces or rods with strips of a given thickness wound spirally around their outer peripheral surfaces.

Figure 3:
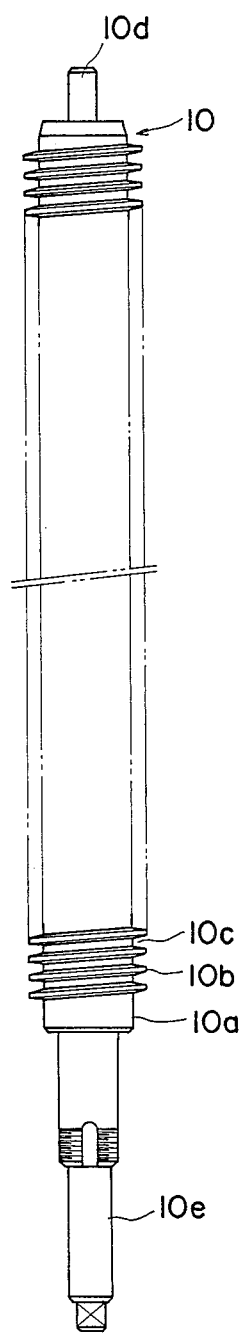
FIG. 3 is a front elevational view of a threaded rod employed in the apparatus of the present invention.

The threaded rods are therefore not limited to particular shapes, but should be constructed such that they can transfer sheet materials while maintaining and positioning them in fixed posture. Accordingly, as shown in FIG. 3, each threaded rod 10 comprises at least a straight cylindrical body 10a of a constant diameter for accurately positioning sheet materials 2 to be transferred, and spiral threads 10b formed around the outer peripheral surface of the cylindrical body 10a at a constant pitch sufficiently larger than the thickness of each sheet material 2.

The overall height or length of the cylindrical body 10a with the spiral threads 10b thereon serves as a region or zone for transferring sheet materials 2. The cylindrical body 10a has on its ends upper and lower shafts 10d, 10e by which the threaded rod 10 is rotatably mounted on the box-shaped housing 11. In the embodiment shown in FIG. 3, the lower shaft 10e is slightly longer than the upper shaft 10d for thereby providing a shaft portion to mount thereon a gear for transmitting rotative power to rotate the threaded rod 10 in a certain direction.

The transfer apparatus 1 incorporating such threaded rods 10 will be described in more detail with reference to FIGS. 4 and 5.

Figure 4:
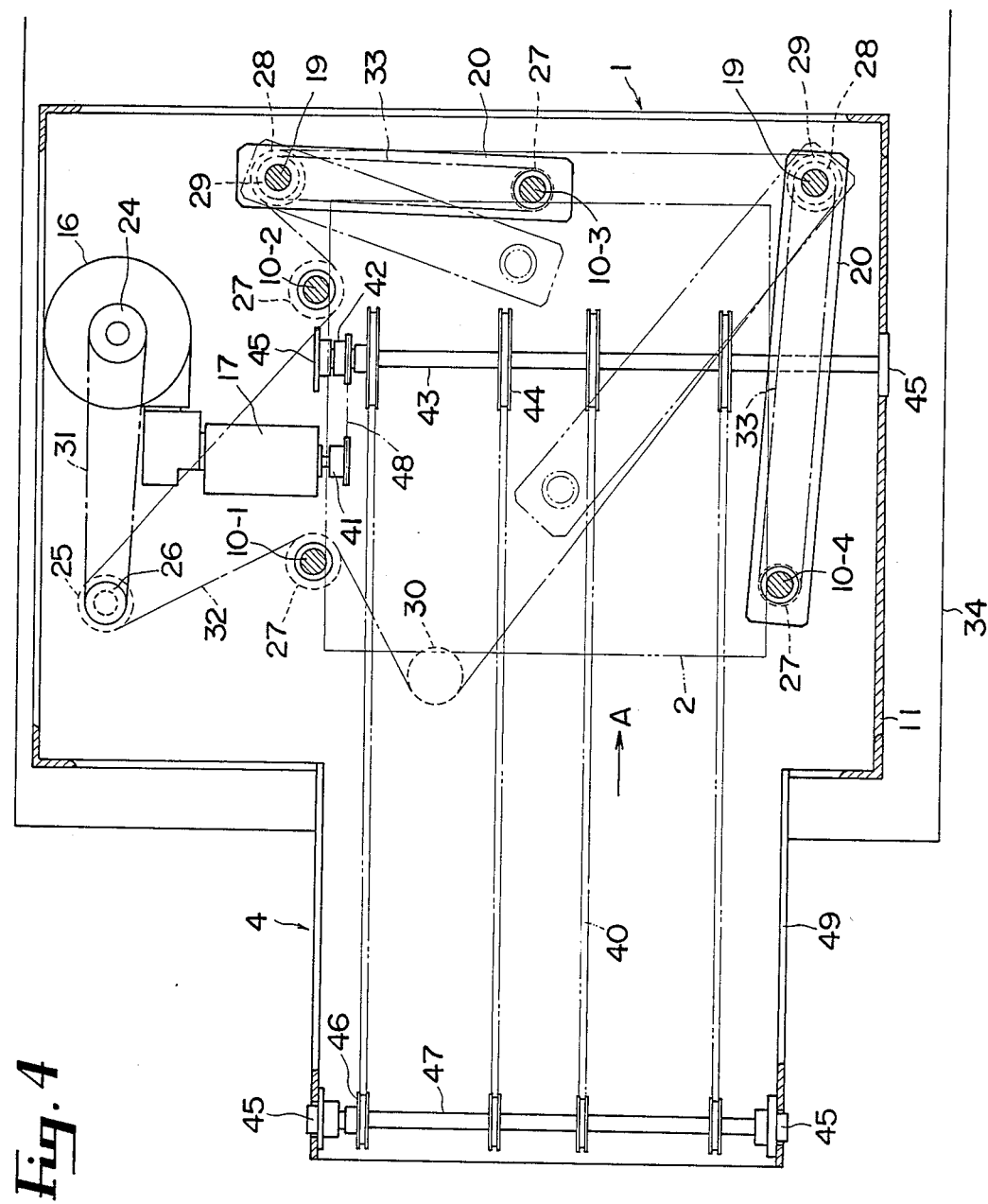
FIGS. 4 and 5 are schematic plan and side elevational views, respectively, showing the apparatus of the invention in greater detail.
Figure 5:
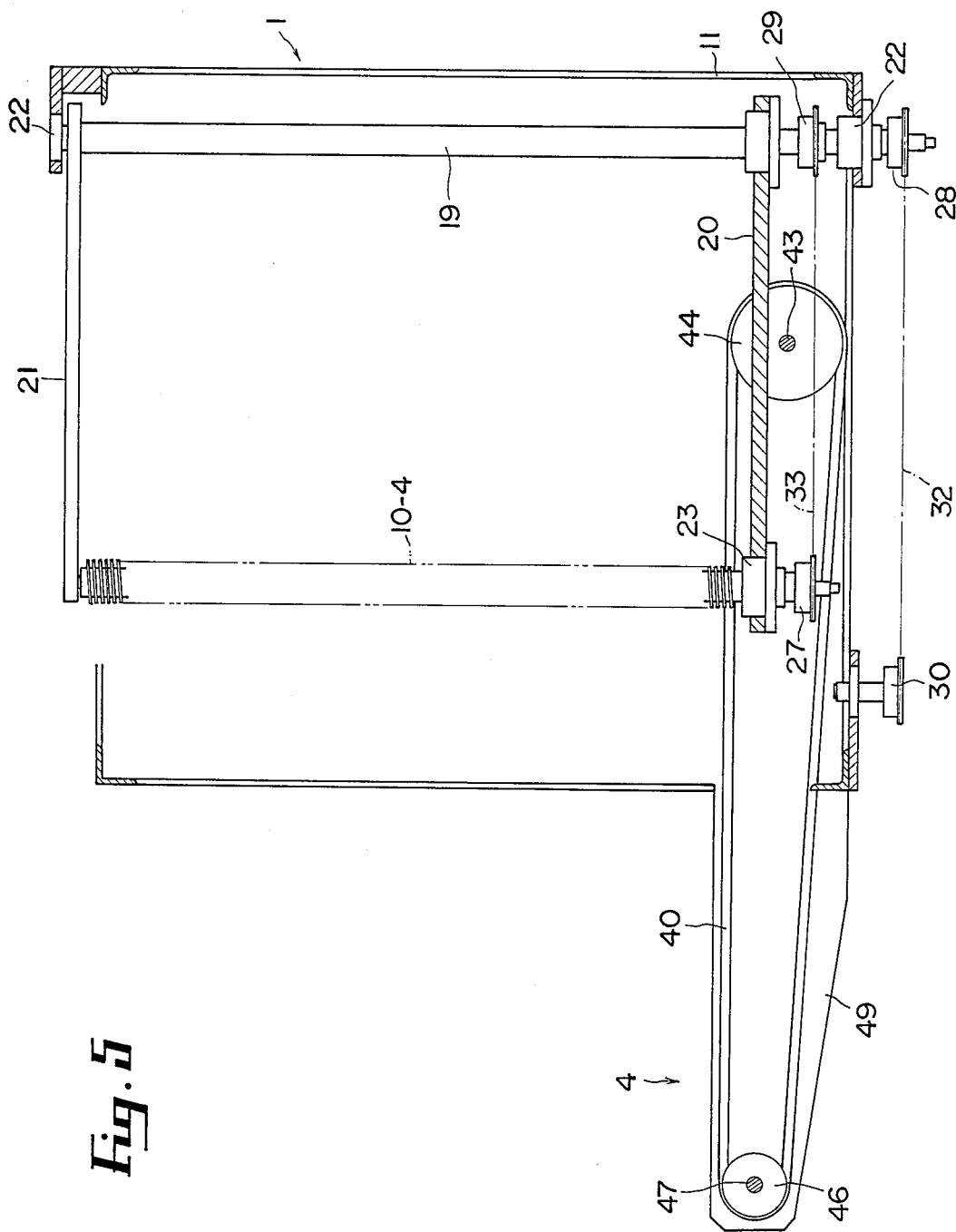

The transfer apparatus illustrated in FIGS. 4 and 5 is combined with a feeder device 4 for transferring vertically upwardly sheet materials 2 such as printed-circuit boards fed along horizontally by the feeder device 4. The box-shaped housing 11 is fixedly mounted on a base plate 34. The first and second threaded rods 10-1, 10-2 extend vertically and are rotatably mounted on the housing 11. The threaded rods 10-1, 10-2 are arranged along the direction in which sheet materials 2 are fed by the feeder device 4, and positioned such that side edges (upper edges as shown in FIG. 4) of sheet materials 2 will contact the bottoms of grooves 10c of the threaded rods, that is, the outer peripheral surface of the cylindrical body 10a. In the embodiment of FIG. 4, the threads of the threaded rods 10-1, 10-2 are lefthanded to impose the force in the direction of the arrow A on sheet materials 2 when the latter are being transported.

The third threaded rod 10-3 is located for abutment against sheet materials 2 transported along. The fourth threaded rod 10-4 is positioned in confronting relation to the first and second threaded rods 10-1, 10-2 across the passage of sheet materials 2.

The threads of the threaded rod 10-3 are lefthanded to apply a force tending to displace sheet materials 2 abutting against the threaded rod 10-3 toward the first and second threaded rods 10-1, 10-2. The threads of the threaded rod 10-4 are righthanded to impose a force tending to displace sheet materials 2 in the direction of the arrow A.

The sheet materials 2 thus transferred by the lefthanded and righthanded threads of the threaded rods 10-1, 10-2, 10-3, 10-4 have side edges held against the outer peripheral surfaces of the cylindrical bodies 10a of the first and second threaded rods 10-1, 10-2, and front edges held against the outer peripheral surface of the cylindrical body 10a of the third threaded rod 10-3. Accordingly, the sheet materials 2 are accurately maintained in the position defined by the first, second and third threaded rods.

The third and fourth threaded rods 10-3, 10-4 are angularly movable in order to follow and meet dimensional variations of sheet materials 2 to be transferred. To this end, a pair of attachment shaft 19 are each rotatably journalled at its upper and lower ends by bearings 22, 22 mounted on the housing 11. Upper and lower arm plates 21, 20 of the same length are fixed to the upper and lower ends of the attachment shaft 19 and extend horizontally in the same direction. The threaded rods 10-3, 10-4 are rotatably mounted on and disposed between distal ends of the arm plates 20, 21 by means of bearings 23. The angular displacement of the third threaded rod 10-3 allows the latter to be moved to the position in which the third threaded rod 10-3 is best suited for the dimensions of a sheet material 2 as transferred. The angular displacement of the fourth threaded rod 10-4, on the other hand, pushes a sheet material 2 against the first and second threaded rods 10-1, 10-2. For these reasons, the third threaded rod 10-3 is kept in a given angularly displaced position and driven to rotate therein, whereas the fourth threaded rod 10-4 is resiliently pressed, as it is rotated, by a spring or the like against the other edge (lower edge as shown in FIG. 4)

of a sheet material 2 at all times for thereby pushing the sheet material 2 toward the first and second threaded rods 10-1, 10-2. Thus, the fourth threaded rod 10-4 cooperates with the third threaded rod 10-3 in pressing the sheet material 2 against the first and second threaded rods 10-1, 10-2.

The first and second threaded rods 10-1, 10-2 are lefthanded and rotated counterclockwise in synchronism, and the third and fourth threaded rods 10-3, 10-4 are righthanded and rotated clockwise in synchronism. In the illustrated embodiment, each of the threaded rods 10 is driven to rotate by an actuator sprocket 27 mounted on the lower shaft 10e of each threaded rod. A motor 16 is fixedly mounted on the base plate 34 and has a motor shaft supporting a driver sprocket 24 fixed thereto. A driven sprocket 25 is rotatably mounted on an upstanding shaft projecting from the base plate 34. A driver chain 31 is trained around the driver sprocket 24 and the driven sprocket 25. A driver sprocket 26 integral with the driven sprocket 25 can thus be driven to rotate by the motor 16.

A first roller sprocket 28 is mounted on the first attachment shaft 19 on which the third threaded rod 10-3 is supported. A second roller sprocket 28 is mounted on the second attachment shaft 19 on which the fourth threaded rod 10-4 is supported. An endless synchronous chain 32 is tranined around the driver sprocket 26, the actuator sprocket 27 mounted on the second threaded rod 10-2, the first and second roller sprockets 28, and the actuator sprocket 27 mounted on the first threaded rod 10-1, for thereby rotating the first and second threaded rods 10-1, 10-2, and the first and second attachment shafts 19 synchronously in a preset direction. The synchronous chain 32 is also trained around an idler sprocket 30 rotatably mounted on the housing 11 for tensioning and guiding the chain 32.

As shown in FIG. 5, a transmission sprocket 29 is secured to each of the attachment shafts 19. An actuator chain 33 is trained around the transmission sprockets 29 and the actuator sprockets 27 mounted on the third and fourth threaded rods 10-3, 10-4 attached to the distal ends of the arm plates 20, 21 for rotating the third and fourth threaded rods 10-3, 10-4 in the direction in which the attachment shafts 10-3, 10-4 rotate. All of the sprockets have teeth the number of which is selected to enable the threaded shafts 10 to rotate at the same speed.

With the transfer apparatus 1 shown in FIGS. 4 and 5, the sheet materials 2 are pushed not only by rotation of the third threaded rod 10-3, but also by the fourth threaded rod 10-4 against the first and second threaded rods 10-1, 10-2. Therefore, side edges of the sheet materials 2 are reliably held against the outer peripheral surfaces of the cylindrical bodies 10a of the first and second threaded rods 10-1, 10-2. Rotation of the first, second and fourth threaded rods 10-1, 10-2, 10-4 causes front edges of the sheet materials 2 to be kept in reliable abutment against the outer peripheral surface of the cylindrical body 10a of the third threaded rod 10-3. Consequently, the sheet materials 2 can be transferred while being positioned accurately in given flat planes and in horizontal posture.

The feeder device 4 shown in FIGS. 4 and 5 serves to feed sheet materials 2 one by one to the transfer apparatus 1. The feeder device 4 comprises a rotatable shaft 43 rotatably mounted by bearings 45, 45 on a lower end portion of the housing 11 relatively closely to a front end thereof, the rotatable shaft 43 supporting thereon a plurality of drive pulleys 44 spaced at suitable intervals. A pair of frame plates 49 are attached to the housing 11 at an open side thereof. A rotatable shaft 47 extends between distal ends of the frame plates 49 and is rotatably supported thereon by means of bearings 45, 45. As many idler pulleys 46 are mounted on the rotatable shaft 47 as the drive pulleys 44, and spaced at the same intervals as those of spacing of the drive pulleys 44. Endless belts 40 are entrained around the aligned sets of drive and idler pulleys 44, 46, respectively.

A sheet material 2 placed on the belts 40 can be fed along into the transfer apparatus 11 by driving the drive pulleys 44 to rotate in a predetermined direction (clockwise as shown in FIG. 5). The feeder device 4 can be driven in synchronism with the transfer apparatus 1 by a power transmissin assembly comprising a speed changing unit 17 operatively coupled to the motor 16, a drive sprocket 41 mounted on an output shaft of the speed changing unit 17, a driven sprocket 42 fixed to an end of the rotatable shaft 43, and a chain 48 trained around the drive and driven sprockets 41, 42. Since the transfer apparatus 1 and the feeder device 4 are driven by the same source of power, they can be operated in synchronism and handled as a combined unit.

An application in which the combined transfer apparatus 1 and feeder device 4 are incorporated will be described with reference to FIGS. 6, 7 and 8.

Figure 8:
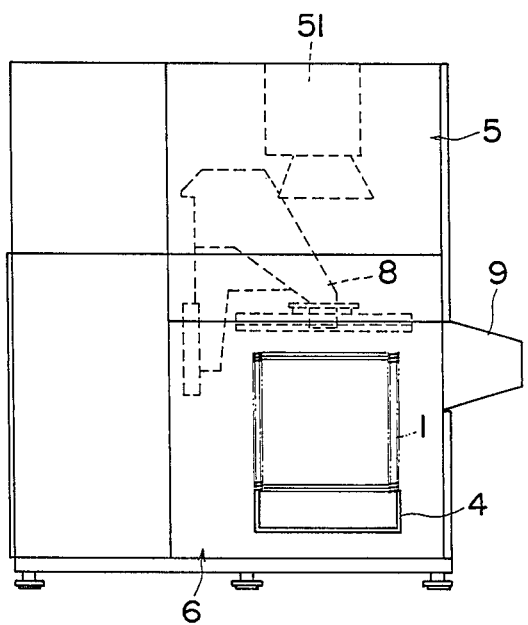
FIGS. 6, 7 and 8 are plan, front elevational, and left-hand side elevational views, respectively, of a printer incorporating the apparatus of the invention.
Figure 6:
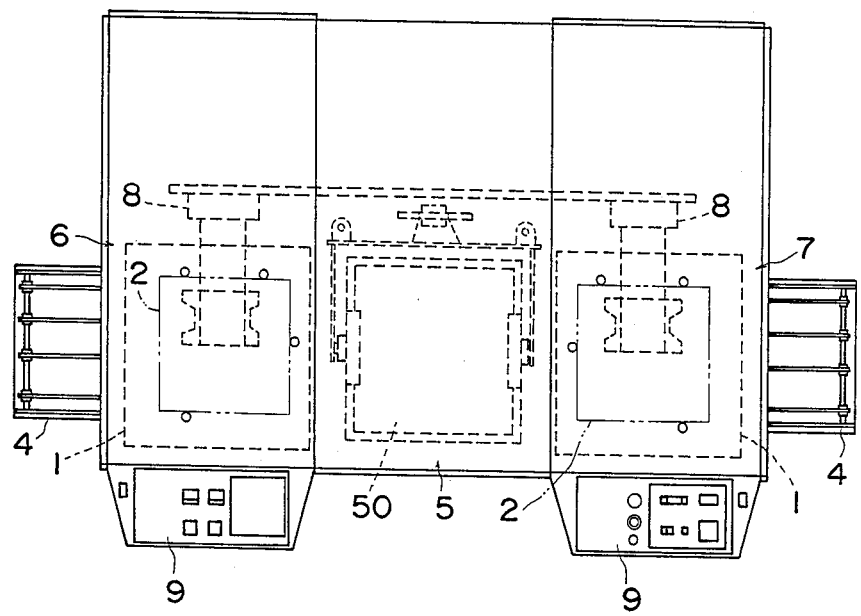
Figure 7:
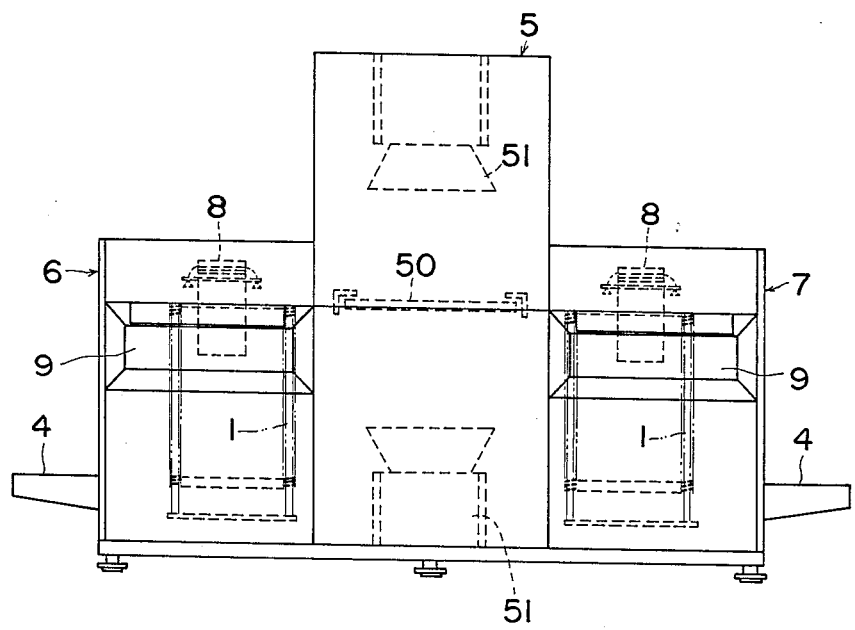

FIGS. 6 through 8 illustrate a printer for printing patterns on printed-circuited boards. A pair of combinations of transfer apparatus 1 and feeder devices 4 are disposed one on each side of a double-sided exposure unit 5 composed of a printing frame 50 with a pattern film attached and a pair of upper and lower sources of light 51, 51 located upwardly and downwardly, respectively, of the printing frame 50. One of the transfer apparatus and feeder device combinations (on the lefthand side as shown in FIG. 6) serves as a loader 6, and the other combination as an unloader 7. A pair of suction feeders 8 are disposed respectively between the loader 6 and the exposure unit 5 and between the exposure unit 5 and unloader 7 for attracting sheet materials 2 under vacuum suction and feeding the same along. Control panels 9 are attached to the loader 6 and the unloader 7, respectively.

Operation of the printer thus constructed is as follows: A sheet material 2 such as a printed-circuit board is supplied from the feeder device 4 to the transfer apparatus of the loader 6 and then onto the printing frame 50 of the exposure unit 5 through the suction feeder 8. The sheet material 2 on which a pattern is printed by the exposure unit 5 is then fed along by the other suction feeder 8 to the transfer apparatus 1 and the feeder device 4 of the unloader 7, and then discharged out of the printer.

The combined feeder device 4 and transfer apparatus 1 of the loader 4 operates exactly in the same manner as that of operation of the arrangement shown in FIGS. 4 and 5. Therefore, sheet materials 2 can be fed into the exposure unit 5 while being positioned with high accuracy. The transfer apparatus of the invention is highly suitable and effective for use in a printer that demands high positioning accuracy.

The transfer apparatus 1 and feeder device 4 of the loader 4 is driven at a speed matching the speed of exposure by the exposure unit 5.

The combined transfer apparatus 1 and feeder device 4 of the unloader 7 is of the entirely same construction as that of the transfer apparatus 1 and feeder device 4 of the loader 6, except that the unloader 7 should be driven to rotate in the opposite direction. When the unloader 7 rotates in the opposite direction, there is a tendency for sheet materials 2 to be prematurely disengaged from between the threaded rods 10 while the transfer apparatus 1 is in operation. To avoid this, a stopper with a smooth surface is mounted in the box-shaped housing 11 on its discharge side for preventing sheet materials 2 from being dislocated from between the threaded rods 10 until the sheet materials 2 are lowered down to the discharge level on the belts 40 of the feeder device 4.

The transfer apparatus 1 employed in the printer illustrated in FIGS. 6 through 8 ensures intervals of time after a sheet material 2 is supplied to the printer and before the sheet material 2 is supplied to the exposure unit 5 and also before an exposed sheet material 2 is discharged out of the printer. These time intervals are long enough to stabilize photosensitive layers just laminated on the sheet material 2 and also to stabilize the exposed photosensitive layers.

This arrangement eliminates the necessity to provide a long transfer path between a laminator for laminating photosensitive layers on the printed-circuit board and the printer and another long transfer path between the printer and a washer unit, a construction which has conventionally been needed to gain a period of time in which to stabilize the photosensitive layers. Therefore, the printer incorporating the transfer apparatus of the invention does not require a wide space for installation, but can be installed in quite a small area.

With the arrangement of the present invention, as described above, sheet materials can smoothly and easily be transferred without interfering with each other as they are supported at three to four points at their peripheral edges. The sheet materials can successively be taken out at predetermined intervals. Sheet materials can be inserted into the transfer apparatus either one by one or all at once. When there is an empty or non-inserted space between adjacent sheet materials as inserted in the transfer apparatus, the threaded rods may be rotated at a higher speed after the sheet material immediately prior to such an empty space has been picked up, for thereby enabling the next sheet material below the empty space to be taken out at substantially the same interval or pace.

The sheet materials as they are taken out can be positioned highly accurately. Furthermore, the transfer apparatus needs a relatively small space for installation even when incorporated in an application in which preset intervals of time are required to stabilize sheet materials such as films prior and subsequently to their being exposed before they are transferred to a next processing step.

Even if sheet materials 2 as they are fed into the transfer apparatus 1 are positioned in inaccurate planes, they will be brought into accurate planar positions while being transferred by the transfer apparatus 1. Therefore, the transfer apparatus is highly suited for transferring sheet materials 2 such as printed-circuit boards to an exposure unit in which extremely accurate positioning is critical. The transfer apparatus of the present invention can easily adapt itself to sheet materials 2 of various dimensions.

Although certain preferred embodiments have been shown and described, it should be understood that many changes and modifications may be made therein without departing from the scope of the appended claims.

What is claimed is:

1. A sheet material transfer apparatus comprising at least three externally threaded rods having threads spaced at equal pitches and grooves therebetween, said threaded rods extending parallel to each other and mounted for rotation ab6ut respective axes, said threaded rods being driveable for synchronous rotation in a same lead direction to transfer each sheet of material inserted edgewise in the grooves of said threaded rods in said lead direction in synchronism with rotation of said threaded rods, and further comprising means for feeding each said sheet positively and directly into edgewise engagement with a corresponding groove of each of said threaded rods wherein each said sheet is generally polygonal in configuration; means for generally squaring each said sheet, said squaring means comprising at least two of said threaded rods having opposite-handed threading and being rotatable oppositely direction-wise and engageable with separate angularly offset edges of said sheet during said transfer; and means for urging at least one edge of each said sheet against said squaring means during said transfer.

2. A sheet material transfer apparatus comprising at least three externally threaded rods having threads spaced at equal pitches and grooves therebetween, said threaded rods extending parallel to each other and mounted for rotation about respective axes, said threaded rods being driveable for synchronous rotation in a same lead direction to transfer each sheet of material inserted edgewise in the grooves of said threaded rods in said lead direction in synchronism with rotation of said threaded rods, and further comprising means for feeding each said sheet positively and directly into edgewise engagement with a corresponding groove of each of said threaded rods, wherein each said sheet is generally polygonal in configuration; means for generally squaring each said sheet with at least two of said threaded rods engaging an edge of said sheet; means for urging at least one edge of each said sheet against said squaring means during said transfer, wherein said urging means comprises means for resiliently pressing at least one other of said threaded rods, during said rotation, into engagement with said sheet and toward said two threaded rods during said transfer while keeping all axes of said rods generally parallel.

3. A sheet material transfer apparatus comprising at least three externally threaded rods having threads spaced at equal pitches and grooves therebetween, said threaded rods extending parallel to each other and mounted for rotation about respective axes, said threaded rods being driveable for synchronous rotation in a same lead direction to transfer each sheet of material inserted edgewise in the grooves of said threaded rods in said lead direction in synchronism with rotation of said threaded rods, and further comprising means for feeding each said sheet positively and directly into edgewise engagement with a corresponding groove of each of said threaded rods, at least two of said threaded rods having same-handed threading, being rotatable in the same direction, and being engageable with separate angularly offset edges of said sheet during said transfer; and at least one other of said threaded rods having opposite handed threading and being rotatable oppositely direction-wise and engageable with another edge spaced from said two edges so as to receive said sheet generally between said one rod and a first of said two rods in order to urge said sheet against a second of said two rods, during said transfer.

* * * * *